(12) United States Patent
Liu (10) Patent No.: US 8,416,429 B2
(45) Date of Patent: Apr. 9, 2013

(54) METHODS AND STRUCTURE FOR SUBSTANTIALLY AUTOMATED DEVICE CAPABILITIES FILE GENERATION USING XML SCHEMA

(75) Inventor: Yue Liu, Milpitas, CA (US)

(73) Assignee: Ricoh Company, Ltd, Tokyo (JP)

( * ) Notice: Subject to any disclaimer, the term of this patent is extended or adjusted under 35 U.S.C. 154(b) by 711 days.

(21) Appl. No.: 12/574,259

(22) Filed: Oct. 6, 2009

(65) Prior Publication Data

US 2011/0080604 A1 Apr. 7, 2011

(51) Int. Cl.
*G06F 3/12* (2006.01)

(52) U.S. Cl. ...... 358/1.13; 705/7.27; 715/771; 715/772; 715/780; 358/1.15

(58) Field of Classification Search ............... 358/1.13, 358/1.15; 707/778, 797, 800, 803, 805, 102, 707/736, 812; 705/7.27; 709/223; 715/513, 715/771, 772, 780

See application file for complete search history.

(56) References Cited

U.S. PATENT DOCUMENTS

| 2006/0232818 A1* | 10/2006 | Hino et al. ........... 358/1.13 |
| 2007/0100871 A1* | 5/2007 | Clemm et al. ........ 715/513 |
| 2009/0279125 A1* | 11/2009 | Liu et al. ........... 358/1.15 |
| 2009/0279126 A1* | 11/2009 | Williams ............ 358/1.15 |
| 2009/0281862 A1* | 11/2009 | Conescu et al. ....... 715/771 |
| 2010/0299327 A1* | 11/2010 | Kiefer et al. ......... 707/736 |

* cited by examiner

*Primary Examiner* — Benny Q Tieu
*Assistant Examiner* — Juan M Guillermety
(74) *Attorney, Agent, or Firm* — Duft Bornsen & Fettig, LLP (57) ABSTRACT

Methods and apparatus for substantially automatically generating a device capabilities file for a device in a printing environment. Features and aspects hereof provide for providing an XML schema (XMLS) file representing the available features of the device and then substantially automatically generating a device capabilities file from the XMLS file. The XMLS file may be substantially automatically generated by appropriate computing tools based on provided JDF job tickets for the device or may be generated by any other means and provided for generation of the device capabilities file. The device capabilities file may be generated by parsing the hierarchical tree structured XMLS file to identify attributes and elements therein. Each attribute is then translated to a corresponding device capabilities entry representing the available features of the device and setting values for each feature to generate the device capabilities file.

17 Claims, 7 Drawing Sheets

METHODS AND STRUCTURE FOR SUBSTANTIALLY AUTOMATED DEVICE CAPABILITIES FILE GENERATION USING XML SCHEMA

BACKGROUND

1. Field of the Invention

The invention relates generally to generation of a device capabilities file for a printing system and more specifically to the use of an eXtensible Markup Language (XML) schema to substantially automatically generate a device capabilities file for a printing system.

2. Discussion of Related Art

In many printing environments, including print shops (large and small) as well as production printing and even smaller workgroup environments, it is generally known to create Job Definition Format (JDF) information describing the processing required to print a particular print job. JDF information is encoded, in accordance with JDF standards, as an XML document. JDF is a widely adopted standard for providing information (printing parameters, layout parameters, finishing parameters, etc.) relating to processing of a print job. The JDF information is typically contained in an object/file referred to as a "job ticket" and is associated with the print data for the print job by entries in the job ticket. The JDF standards are published by CIP4 (a trade organization), are well known to those of ordinary skill in the art, and are readily available at www.cip4.org.

In most printing environments, a JDF job ticket is generated by interaction with a user by presenting the user with available features and setting for those available features. In some printing environments the available features and the possible settings for those features are often described in a device capabilities file used by the print job generator application's user interface. The print job generator application presents the user with information provided in the device capabilities file and receives user input selecting particular features and settings for those features. The print job generator then generates a JDF job ticket defining the parameters for printing the job.

Many manufacturers of printing system provide such a device capabilities file. The format for such device capabilities files can often be complex and is also standardized by CIP4 as an aspect of the JDF family of standards. However, many devices from other manufacturers are sold/provided without the manufacturer providing a device capabilities file—or at least not providing such capabilities in a standardized format used for the device capabilities files provided by many other manufacturers. These printing devices may include print engines and various pre-processing and post-processing devices—e.g., "finisher" devices such as folders, staplers, etc. A user/purchaser of such devices that relies on a print job generator to generate print jobs may therefore need to manually construct a device capabilities file to describe the available features and associated feature settings for these printing devices that are devoid of a manufacturer supplied device capabilities file. Such manual processing is complex and prone to human errors.

Thus it is an ongoing challenge to generate a device capabilities file while reducing or eliminating human errors in the process.

SUMMARY

The present invention solves the above and other problems, thereby advancing the state of the useful arts, by providing methods and associated structure for substantially automatically generating a device capabilities file for a device from a provided eXtensible Markup Language Schema (XMLS) file. The XMLS file is parsed to identify all elements and attributes therein and corresponding entries are generated in a device capabilities file to describe available features of the device. In one exemplary embodiment, the XMLS file may be substantially automatically generated from user input and/or from a plurality of JDF job tickets.

One aspect hereof provides a method for generating a device capabilities file for a corresponding device in a printing environment. The method includes providing an XMLS file describing features of the device. The method parses the XMLS file to identify one or more types defined in the XMLS file and to associate each identified type with a list of attributes and elements defined within the scope of the identified type. The identified types are processed to generate entries in the device capabilities file based on the list of attributes and elements.

Another aspect hereof provides a method for generating a device capabilities file describing available features for a corresponding device in a printing environment. The method includes providing a plurality of Job Definition Format (JDF) job tickets defined for use with the device and generating an XMLS file from the plurality of JDF job tickets. The method then generates a device capabilities file for the device based on the XMLS file.

Still another aspect hereof provides a system for generating a device capabilities file for a device in a printing environment. The system includes an XMLS file describing available features of the device. The XMLS file comprising one or more hierarchically arranged elements each describing one or more attributes corresponding to available features of the device. The system also includes a device capabilities generator coupled to receive the XMLS and adapted to generate entries in the device capabilities file based on the attributes and elements in the XMLS file.

BRIEF DESCRIPTION OF THE DRAWINGS

The same reference number represents the same element or same type of element on all drawings.

DETAILED DESCRIPTION OF THE DRAWINGS

FIGS. 1 through 8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
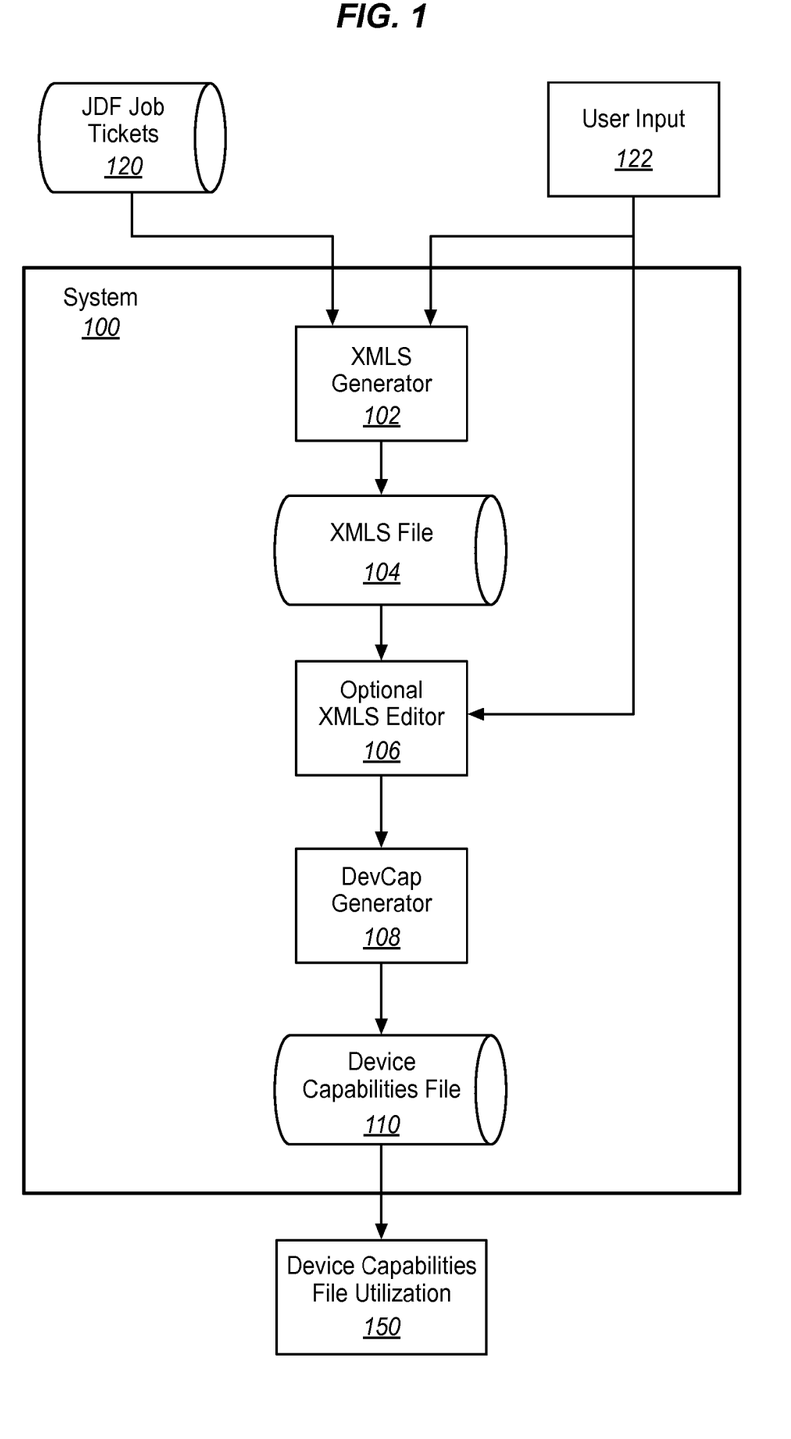
FIG. 1 is a block diagram of an exemplary system adapted to substantially automatically generate a device capabilities file for a corresponding device from a provided XMLS file in accordance with features and aspects hereof.

FIG. 1 is a block diagram of an exemplary system 100 enhanced in accordance with features and aspects hereof to provide for substantially automated generation of a device capabilities file. System 100 includes device capabilities generator 108 coupled to receive XML Schema (XMLS) file 104 representing available features of a corresponding device such as in a printing environment. Device capabilities generator 108 processes the XMLS file 104 to generate entries in device capabilities file 110. Device capabilities file 110 may be utilized, for example, by utilization element 150. Utilization element 150 may be, for example, any suitable computing device adapted to generate print jobs based on information in the device capabilities file 110. In one exemplary embodiment, utilization element 150 may utilize device capabilities file 110 to generate JDF job tickets representing print jobs to be applied to a printing system.

In one exemplary embodiment, system 100 may also include XMLS generator 102 for substantially automatically generating XMLS file 104. In one exemplary embodiment, XMLS generator 102 may receive user input 122 to define available features of the corresponding device based on the user's supplied information. In another exemplary embodiment, XMLS generator 102 may receive a plurality of JDF job tickets 120 to substantially automatically generate XMLS file 104. The plurality of JDF job tickets 120 may comprise JDF job tickets previously utilized for defining print jobs associated with a corresponding device. In addition, or in the alternative, the plurality of JDF job tickets 120 may comprise a set of JDF job tickets representing as a whole all possible combinations of settings for each of the available features of the corresponding device. Such an exhaustive set of JDF job tickets 120 may be generated by suitable computing devices adapted to create all such possible combinations of feature settings in the format of a plurality of JDF job tickets.

In exemplary embodiments where XMLS file 104 is substantially automatically generated, system 100 may also comprise an optional XMLS editor 106 adapted to adjust entries in the substantially automatically generated XMLS file 104. XMLS editor 106 may itself be substantially automated in that it may parse entries of the XMLS file 104 and identify, for example, default values to be specified in the adjusted XMLS file 104 entries as well as, for example, ranges of numeric values for feature settings in entries of the XML file 104. In other exemplary embodiments, optional XMLS editor 106 may adjust entries of XMLS file 104 in response to user input 122. By way of example, if a feature setting includes a clearly identifiable, likely default value such as "None" or "Auto" that value may be identified as a default value. Of, for example, if a feature setting is a range of values, the value "1" may be identified as the default value. In other cases where a list of enumerated feature setting values, the default value may be selected as the first in the list or the first in an alphabetic sorting of the list. Those of ordinary skill in the art will recognize numerous approaches and heuristic rules that may be applied to identify a default feature setting value.

System 100 may be implemented as a typical computing system such as a personal computer, workstation, server computing device, or any other suitable electronic device adapted to perform the functions of the device capabilities generator 108 and, optionally, adapted to perform the functions of XMLS editor 106 and XMLS generator 102. In one exemplary embodiment, device capabilities generator 108, optional XMLS editor 106, and XMLS generator 102 may be implemented as suitably programmed instructions operable in such a computing system 100. Further, in such exemplary embodiments of system 100, XMLS file 104, device capabilities file 110, and JDF job tickets 120 may be stored in a memory or mass storage device associated with system 100 including, for example, local mass storage and/or a remote mass storage accessible through a network. Still further, system 100 may include any suitable means for receiving user input including, for example, keyboard, voice recognition, touch-screen, pointer devices, etc. Those of ordinary skill in the art will readily recognize numerous additional and equivalent elements and functions operable within system 100. Such additional and equivalent elements and functions are omitted herein for simplicity and brevity of this discussion.

Figure 2:
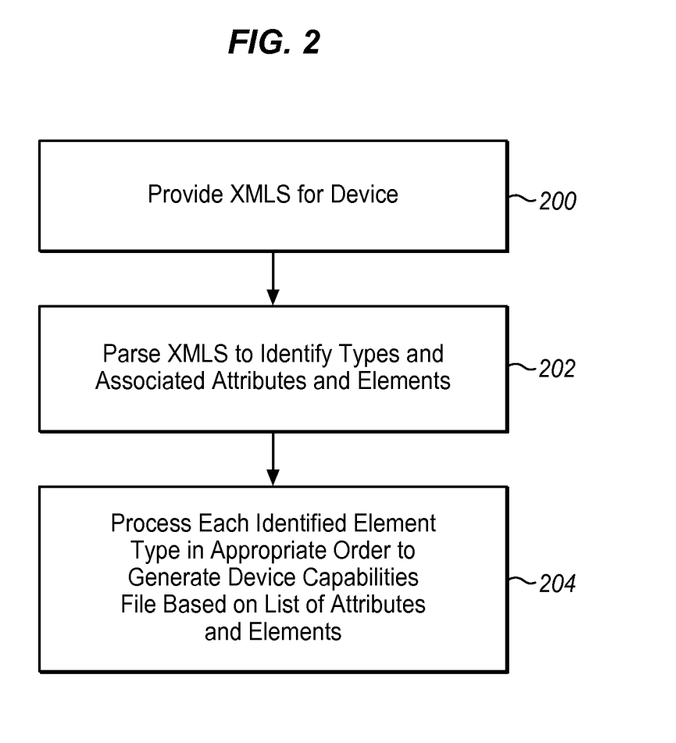
FIG. 2 is a flowchart describing an exemplary method for substantially automatically generating a device capabilities file for a corresponding device from a provided XMLS file in accordance with features and aspects hereof.

FIG. 2 is a flowchart describing an exemplary method for substantially automatically generating a device capabilities file in accordance with features and aspects hereof. The method of FIG. 2 may be performed in any suitable computing or electronic device such as system 100 of FIG. 1. Step 200 provides an XMLS file describing available features of the corresponding device. As noted above and as further detail herein below, the XMLS file may also be substantially automatically generated based on information supplied by the user and/or based on information derived from JDF job tickets associated with a corresponding device. As is well known to those of ordinary skill in the art, the JDF standard defines a number of parameters and attributes that may be associated with a print job. The standard features so defined by the JDF standard are defined in a hierarchical, tree structured manner. Thus, an XMLS generated from JDF job tickets or representing available JDF features of a device will also reflect this hierarchical nature. Step 202 then parses the provided XMLS file to identify various types of elements hierarchically defined therein and to identify associated attributes and other elements defined within the hierarchical scope of each identified type of element. In particular, in one exemplary embodiment, step 202 creates an element type table entry. The table entry indicates an element type name ("JDFType", or "ResourcePoolType", for example) and includes an associated field specifying a list of attributes and other elements defined within the identified element type name. The table so generated may then be used in further processing described below for each identified element.

Step 204 then processes the identified element types parsed in the processing of step 202, in an appropriate order to generate device capability entries in a device capabilities file based on the list of associated attributes and other elements for each identified type of element. The device capabilities file so generated by processing of step 204 may then be utilized by printing related applications to generate JDF job tickets for print jobs to be applied to the corresponding device of a printing system.

Figure 8:
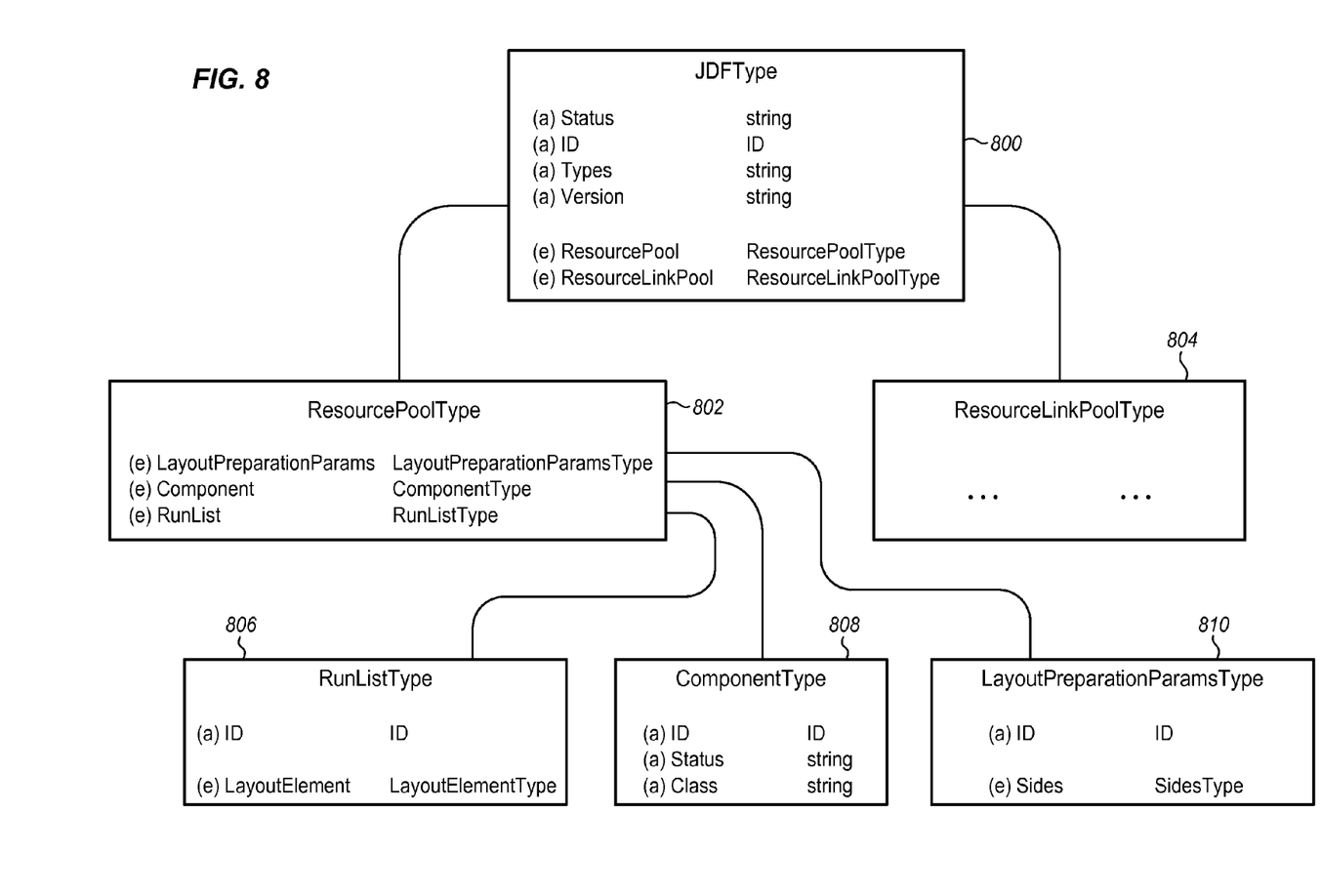
FIG. 8 is a block diagram showing graphical relationships between elements and attributes as defined in an exemplary JDF job ticket and a related exemplary XMLS file generated from the exemplary JDF job ticket.

The hierarchy of elements and attributes of such an XMLS file structure generated from JDF job tickets may be represented graphically as shown in FIG. 8. JDFType 800, the root type of the XMLS hierarchy, includes four attributes—attribute "Status" of type string, attribute "ID" of type ID, attribute "Types" of type string, and attribute "Version" of type string. In addition, JDFType 800 may include two elements hierarchically defining still further attributes and elements. The exemplary additional elements of JDFType 800 may include ResourcePool element of type ResourcePoolType and ResourceLinkPool of type ResourceLinkPoolType. Descending a next level deeper into the hierarchy of JDF elements defined in the exemplary XMLS, ResourcePoolType 802 may include three exemplary elements defined in a still deeper level of the XMLS hierarchy. In particular, for example, ResourcePoolType 802 may include LayoutPreparationParams element of type LayoutPreparationParamsType (further defined in 810), Component element of type ComponentType (further defined in 808), and RunList element of type RunListType (further defined in 806). Each of these hierarchically deeper elements of the XMLS may, in turn, define still further attributes and elements as shown in FIG. 8.

Figure 3:
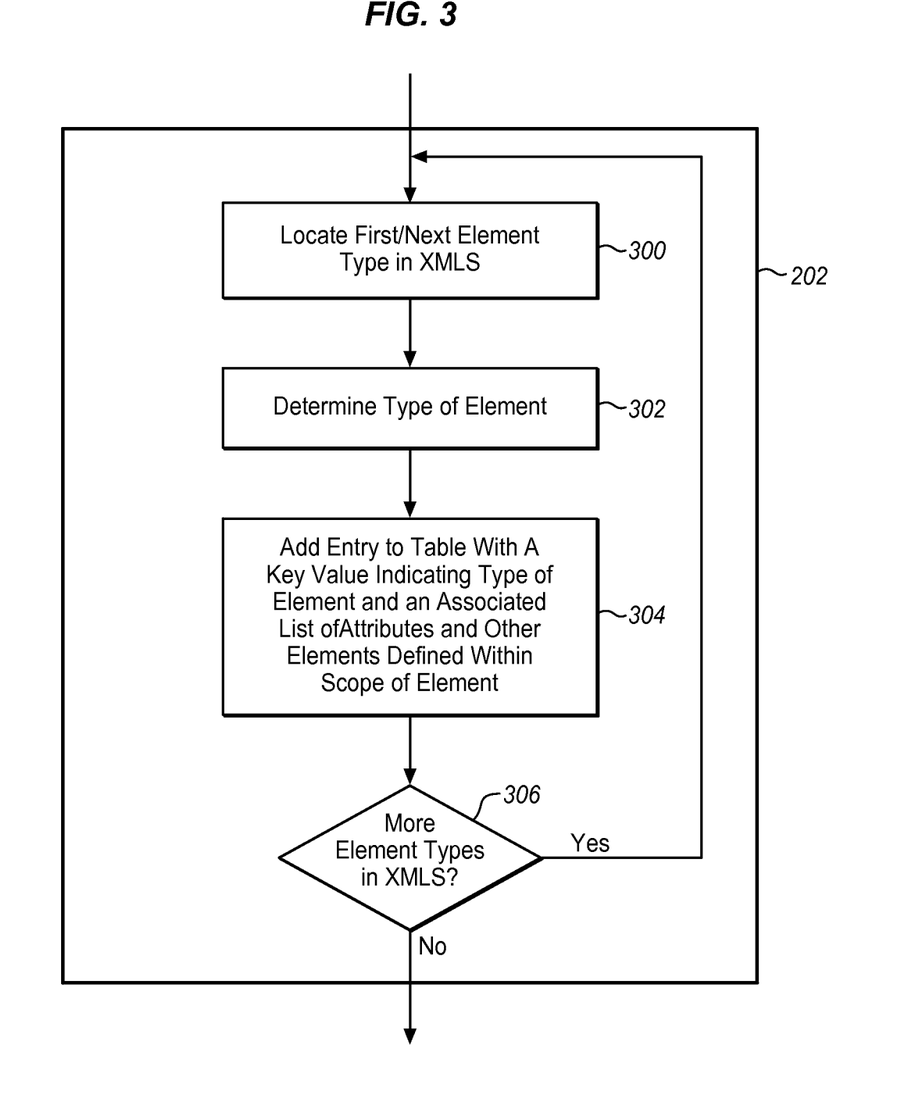
FIG. 3 is a flowchart describing exemplary additional details for processing of FIG. 2 to parse a provided XMLS file to identify types of elements and attributes defined therein in accordance with features and aspects hereof.

FIG. 3 is a flowchart providing exemplary additional details of the processing of step 202 of FIG. 2 to parse the provided XMLS file. In one exemplary embodiment noted above, the XMLS file may be parsed and a corresponding table may be generated for further referencing. Each entry of the table may identify an element type for each encountered element of the XMLS file and may associate with each element type a list of attributes and other elements defined within the scope of the corresponding identified element type. Such a table may then be utilized in further referencing of the XMLS as discussed further herein below to generate the corresponding device capabilities file. Steps 300 through 306 are iteratively operable for each element type encountered in parsing the XMLS file. Step 300 locates the first/next element type in the XMLS file. Given the well-defined syntactic structure of entries in an XMLS file, parsing the XMLS syntax to locate a first or next element type entails processing well-known to those of ordinary skill in the art. Step 302 then determines the list of attributes and other elements defined for this element type. Step 304 then adds a new entry to a table having a key field value indicating the element type name and a corresponding value field entry representing a list of associated attributes and other elements defined within the scope of the presently located element type. This list of associated attributes and elements may then be utilized in subsequent processing described further herein below to generate a device capabilities file. Step 306 then determines whether additional element types remain within the XML file to be processed. If so, processing continues looping back to step 300. Otherwise, processing of step 202 is completed and a corresponding table generated indicating the name of each element type encountered in the XML file and, associated with each identified type name, a corresponding list of attributes and elements defined within the scope of the identified type. Those of ordinary skill will readily recognize that the table structure suggested in FIG. 3 represents one exemplary method of parsing the elements within the XMLS file. Other parsing techniques to locate/identify each element type and associate each element type with corresponding attributes and with hierarchically deeper elements will be readily apparent to those of ordinary skill in the art.

An exemplary table is shown below corresponding to the exemplary XMLS hierarchical tree structure described above with respect to FIG. 8.

| Element Type (key field) | Associated Attributes and Elements (value field) |
|---|---|
| JDFType | (attributes) Status, ID, Types, Version (elements) ResourcePool, ResourceLinkPool |
| ResourcePoolType | (no attributes) (elements) LayoutPreparationParams, Component, RunList |
| ResourceLinkPoolType | . . . |
| LayoutPreparationParamsType | (attributes) ID (elements) Sides |
| ComponentType | (attributes) ID, Status, Class (no elements) |
| RunListType | (attributes) ID (elements) LayoutElement |
| LayoutElementType | . . . |

Figure 4:
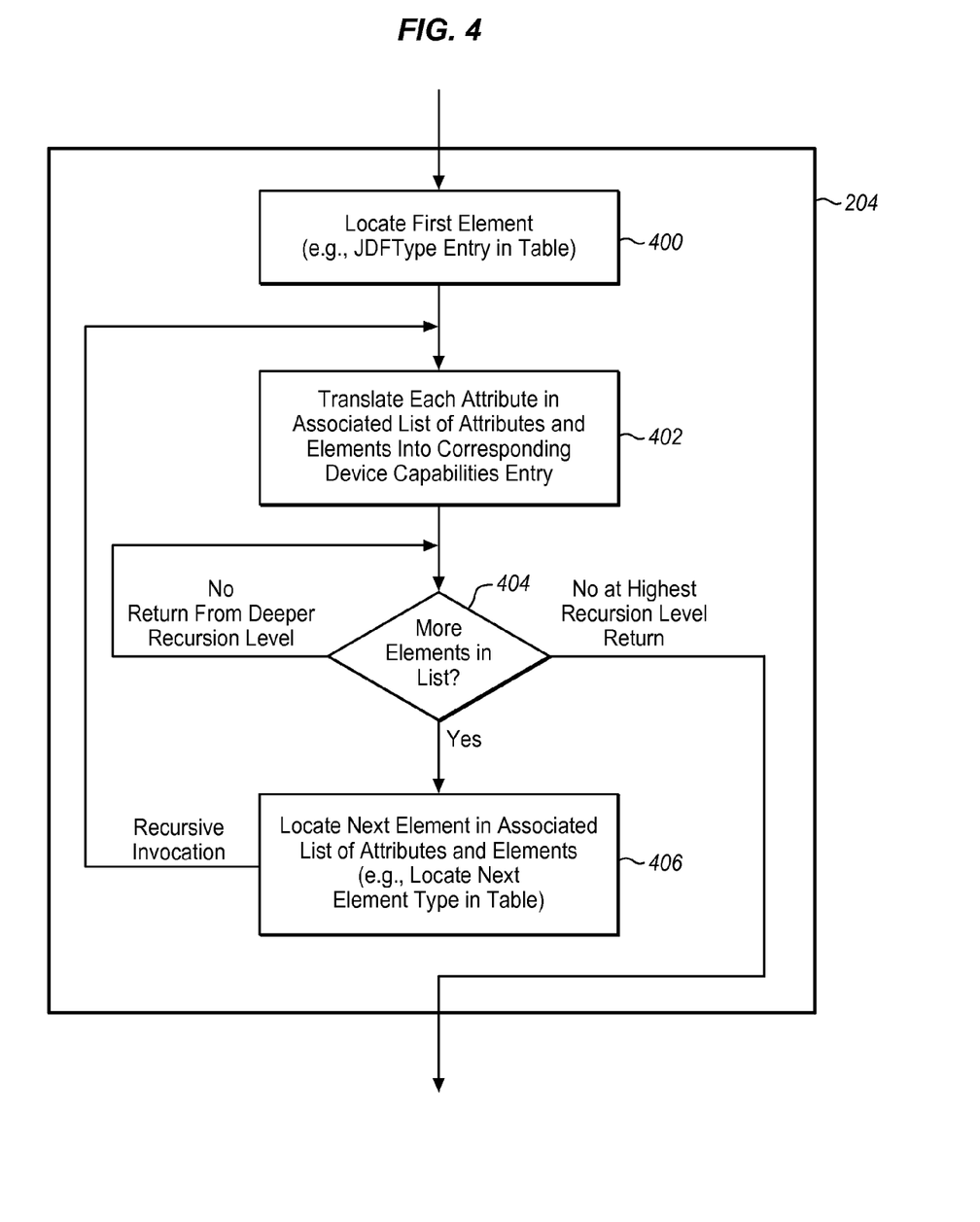
FIGS. 4 and 5 are flowcharts describing exemplary additional details for processing of FIG. 2 to process the elements and attributes identified in the provided XMLS file in accordance with features and aspects hereof.

FIG. 4 is a flowchart describing exemplary additional details of the processing of step 204 of FIG. 2 to process element types identified by the parsing of step 202 described above in an appropriate order. Step 400 of FIG. 4 start by processing JDF element located in XMLS file, therefore locates the element type in the generated table having the type key field mapping to element with root name "JDF", usually "JDFType". The JDFType element located at step 400 represents the root of the hierarchical tree structure of the XMLS file. All attributes and other hierarchically deeper elements are defined within the scope of the JDFType element. Steps 402 through 406 are then iteratively (recursively) operable to translate each attribute defined within the scope of the JDFType element into corresponding entries in the device capabilities file. Step 402 first translates each attribute in the associated list of attributes and elements in the presently located element from the generated table. Initially, the first element having the JDFType key value is processed to translate each attribute defined directly in the JDFType element. Step 404 then determines whether the associated list of attributes and elements in the presently located element being processed includes additional elements (i.e., elements defined one level deeper in the hierarchical tree structure of the XMLS). If so, step 406 locates the next element in the associated list of attributes and elements for the element currently being processed. Processing then continues by recursively invoking steps 402 through 406 to translate each attribute and element in the associated list of attributes and elements in the next located element. If no further elements remain to be processed at the current recursion level. Step 404 also determines whether the recursive processing has completed back to the highest (initial) level of recursion. If not, the current recursion level returns to the previous recursion level (at step 404). If the highest (initial) recursion level has completed, processing of step 204 is complete.

Figure 5:
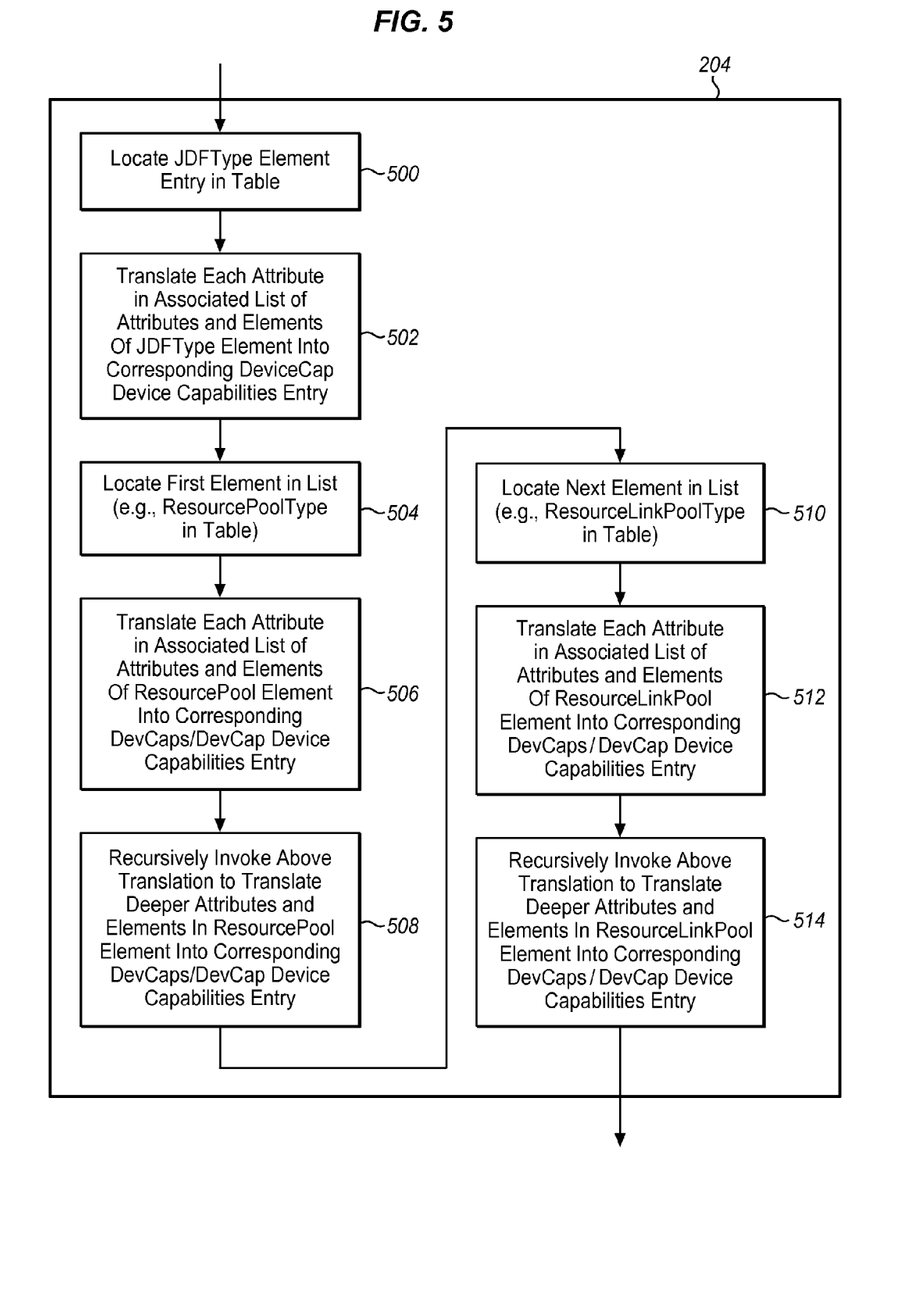

FIG. 5 is a flowchart describing exemplary additional details of the processing of step 204 of FIG. 2 in another exemplary embodiment for processing every attribute and element in the table structure generated by the parsing of step 202. In an XMLS file generated from a plurality of JDF job tickets, it is typical that the structure of the entries in the XMLS file will include a highest level root element as the JDF element (assigned a type of, for example, JDFType). The JDF element will have a number of standard attributes associated there with and will include at least two hierarchically deeper elements defined within the scope of the JDF element—namely a ResourcePool element and a ResourceLinkPool element. The method of FIG. 5 represents exemplary additional details of the processing of step 204 anticipating such a hierarchical tree structure of JDF elements. Step 500 therefore first locates the JDFType element in the table constructed by parsing of step 202 described above. Step 502 translates each attribute defined within the root level JDF element to generate a corresponding entry in the device capabilities file. As noted above, the table entry for the JDFType element may include a list of attributes and other elements defined within the scope of the JDF root element. Step 504 locates the first element, ResourcePoolType element, for example, in the provided table structure. This table entry will also include a corresponding list of associated attributes and elements defined within the scope of the ResourcePool element. Step 506 translates each attribute in the associated list of attributes and elements for the ResourcePool element into corresponding DevCaps/DevCap entries in the device capabilities file. Step 508 recursively invokes the translation processing of step 506 for each element in the list of attributes and elements associated with the resource pool element. This recursive invocation translates all attributes of elements defined within hierarchically deeper elements associated with the Resource-Pool element. All such attributes will be translated into Dev-Caps/DevCap entries in the generated device capabilities file. Steps 510 through 514 then perform processing similar to steps 504 through 508 on behalf of another element type, the ResourceLinkPoolType element, for example, located in the provided table from the parsing of step 202.

The processing of attributes and elements in the XMLS file to generate corresponding device capabilities entry may also be further understood with reference to the following examples. The examples below provide a fragment of an XMLS file generated for a device based on a plurality of hypothetical JDF job tickets associated with the corresponding device. Each fragment is followed by the corresponding entries of the device capabilities file generated by the processing described above with respect FIGS. 2 through 5.

An exemplary fragment of an XMLS file may appear as follows:

```
<attribute name="Sides" default="OneSidedFront">
    <SimpleType>
        <restriction base="string">
            <enumeration value="OneSidedFront"></enumeration>
            <enumeration value="TwoSidedFlipX"></enumeration>
            <enumeration value=" TwoSidedFlipY"></enumeration>
        </restriction>
    </SimpleType>
</attribute>
```

Entries in the device capabilities file generated from the above fragment of an exemplary XMLS file may appear as follows:

```
<StringState DefaultValue="OneSidedFront" Name="Sides">
    <Value AllowedValue="OneSidedFront"/>
    <Value AllowedValue="TwoSidedFlipX"/>
    <Value AllowedValue=" TwoSidedFlipY"/>
</StringState>
```

As shown in the above exemplary fragments, rules (e.g., heuristic rules) may be applied in the translation process to generate the required fields of the entries of the device capabilities file. For example, the attribute name "Sides" may be used as the feature name in the device capabilities entry. A rule may recognize that the attribute is described in the XMLS as a "SimpleType" with a base of "string" and therefore may generate the feature in the device capabilities entry as a "StringState" feature. Each "enumeration value" in the XMLS attribute entry may generate a corresponding "AllowedValue" in the feature in the entry of the device capabilities file. The "default" setting of the attribute in the XMLS may be translated to a corresponding "DefaultValue" specification in the feature of the device capabilities file. In like manner, a "SimpleType" of base "int" may be translated to an "IntState" feature setting in the device capabilities file.

Figure 6:
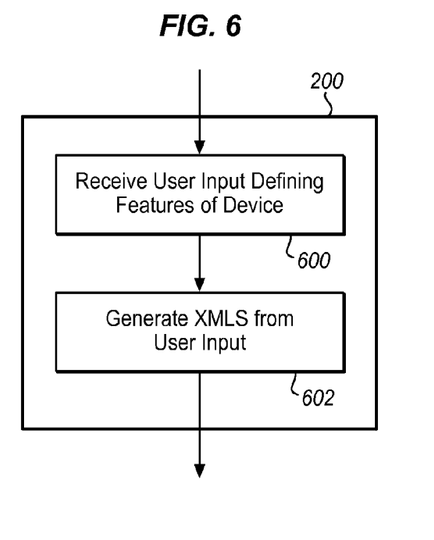
FIGS. 6 and 7 are flowcharts describing exemplary additional details of processing of FIG. 2 to substantially automatically generate an XMLS file from user input and/or from a plurality of JDF job tickets associated with the device in accordance with features and aspects hereof.

As noted above, the XMLS file may be generated substantially automatically or may be generated by standard XML schema editor and creation applications based on user input. FIG. 6 is a flowchart providing exemplary additional details of the processing of step 200 of FIG. 2 to generate an XMLS file based on user input. The method of FIG. 6 may be operable utilizing any standard XML editor/generator tool responsive to a user's input. Step 600 first receives user input defining features of the corresponding device. Step 602 then generates an XMLS file based on the received user input.

Figure 7:
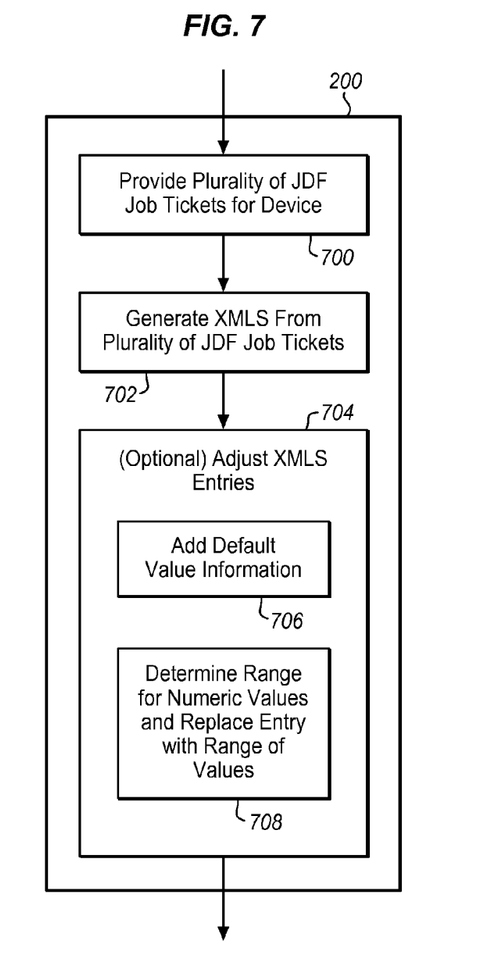

FIG. 7 is a flowchart providing exemplary additional details of the processing of step 200 of FIG. 2 to substantially automatically generate an XMLS file based on a plurality of JDF job tickets for the corresponding device. Step 700 first provides a plurality of JDF job tickets for the corresponding device. The plurality of John JDF job tickets may represent a collection of previously utilized JDF job tickets associated with the corresponding device for processing actual print jobs. In alternative embodiments, the plurality of JDF job tickets provided by step 700 may be generated as a set of JDF job tickets representing all possible combinations of features and corresponding settings for features available in the corresponding device. Step 702 automatically generates an XMLS file from the provided plurality of JDF job tickets.

In one exemplary embodiment, the method of FIG. 7 may also include optional adjustment of the automatically generated XMLS entries as indicated by optional step 704. For example, the automatic generation of an XMLS from the plurality of JDF job tickets may be incapable of determining a default value for a feature setting if none is provided in the plurality of JDF job tickets (and thus absent from the automatically generated XMLS). Step 704 may therefore include processing of step 706 to add default value information to features in the entries of the automatically generated XMLS based on received user input or any other suitable means. In like manner, the automated tools for generating an XMLS from a plurality of JDF job tickets may not readily recognize a complete range of possible values for an available numeric feature of the corresponding device. Step 708 of optional step 704 may therefore determine from user input or other appropriate means a minimum and maximum value defining a range of possible values for an available numeric feature of the corresponding device. Step 708 then replaces entries in the automatically generated XMLS file with adjusted entries indicating the possible range of values for a numeric feature of a corresponding device.

Those of ordinary skill in the art will readily recognize numerous additional and equivalent steps that may be present in the exemplary methods of FIGS. 2 through 7. Such additional and equivalent steps are omitted herein for simplicity and brevity of this discussion.

The translation processing of the exemplary methods described above may also be understood with reference to an exemplary XMLS and a corresponding device capabilities file substantially automatically generated from the exemplary XMLS file.

An exemplary XMLS file, generated from a plurality of JDF job tickets for the corresponding device may appear as follows:

```xml
<?xml version="1.0" encoding="UTF-8"?>
<schema targetNamespace="http://www.ricoh.com/mariposa/Capabilities/XeroxIDPSchema"
elementFormDefault="qualified" xmlns="http://www.w3.org/2001/XMLSchema"
xmlns:jdf="http://www.ricoh.com/mariposa/Capabilities/XeroxIDPSchema">
    <element name="JDF" type="jdf:JDFType"></element>
    <complexType name="JDFType">
        <all>
            <element name="ResourcePool" type="jdf:ResourcePoolType"></element>
            <element name="ResourceLinkPool"
                type="jdf:ResourceLinkPoolType">
            </element>
        </all>
        <attribute name="Status" type="string" fixed="Waiting"></attribute>
        <attribute name="Type" type="string" fixed="Combined"></attribute>
        <attribute name="ID" type="ID"></attribute>
        <attribute name="Types" type="string"
            fixed="LayoutPreparation Imposition Interpreting Rendering     DigitalPrinting">
        </attribute>
        <attribute name="Version" type="string" fixed="1.2"></attribute>
    </complexType>
    <complexType name="ResourcePoolType">
        <all>
            <element name="LayoutPreparationParams"
                type="jdf:LayoutPreparationParamsType">
            </element>
            <element name="Component" type="jdf:ComponentType"></element>
            <element name="RunList" type="jdf:RunListType"></element>
        </all>
    </complexType>
    <complexType name="ResourceLinkPoolType">
        <all>
            <element name="LayoutPreparationParamsLink"
                type="jdf:LinkType">
            </element>
            <element name="RunListLink" type="jdf:LinkType"></element>
            <element name="ComponentLink"
                type="jdf:ComponentLinkType">
            </element>
        </all>
    </complexType>
    <complexType name="LayoutPreparationParamsType">
        <sequence>
        </sequence>
        <attribute name="ID" type="ID"></attribute>
        <attribute name="Sides" default="OneSidedFront">
            <simpleType>
                <restriction base="string">
                    <enumeration value="OneSidedFront"></enumeration>
                    <enumeration value="TwoSidedFlipX"></enumeration>
                    <enumeration value="TwoSidedFlipY"></enumeration>
                </restriction>
            </simpleType>
        </attribute>
    </complexType>
    <complexType name="ComponentType">
        <attribute name="ID" type="ID"></attribute>
        <attribute name="Status" type="string" fixed="Unavailable"></attribute>
        <attribute name="Class" type="string" fixed="Quantity"></attribute>
    </complexType>
    <complexType name="RunListType">
        <sequence>
            <element name="LayoutElement"
                type="jdf:LayoutElementType"></element>
        </sequence>
        <attribute name="ID" type="ID"></attribute>
    </complexType>
    <complexType name="LayoutElementType">
        <sequence>
            <element name="FileSpec" type="jdf:FileSpecType"></element>
        </sequence>
        <attribute name="ID" type="ID"></attribute>
    </complexType>
    <complexType name="FileSpecType">
        <sequence>
        </sequence>
        <attribute name="URL" type="jdf:URLType"></attribute>
        <attribute name="ID" type="ID"></attribute>
    </complexType>
    <complexType name="RefType">
        <attribute name="rRef" type="IDREF"></attribute>
```

```
    </complexType>
    <simpleType name="URLType">
        <restriction base="string">
            <minLength value="0"></minLength>
            <maxLength value="255"></maxLength>
        </restriction>
    </simpleType>
    <complexType name="LinkType">
        <attribute name="rRef" type="IDREF"></attribute>
        <attribute name="Usage" type="string" fixed="Input"></attribute>
    </complexType>
    <complexType name="ComponentLinkType">
        <attribute name="rRef" type="IDREF"></attribute>
        <attribute name="Usage" type="string" fixed="Output"></attribute>
        <attribute name="Amount" default="1">
            <annotation>
                <documentation></documentation>
            </annotation>
            <simpleType>
                <restriction base="int">
                    <minInclusive value="1"></minInclusive>
                    <maxInclusive value="999"></maxInclusive>
                </restriction>
            </simpleType>
        </attribute>
    </complexType>
</schema>
```

A device capabilities file may be substantially automatically generated from the above exemplary XMLS file as follows:

```
<?xml version="1.0" encoding="UTF-8"?>
<DeviceInfo DeviceID="" DeviceStatus="Running">
<Device DeviceID="" ModelName="Xerox DocuColor 240 / Creo Spire CX250"
        ModelNumber="20081023"
        FriendlyName="Xerox DocuColor 240 / Creo Spire CX250"
        JMFURL="" PresentationURL="">
<DeviceCap CombinedMethod="Combined" Types="LayoutPreparation Imposition
           Interpreting Rendering DigitalPrinting">
    <DevCaps Context="Resource" ID="1" Name="LayoutPreparationParams">
        <DevCap ID="2" Name="LayoutPreparationParams">
            <DevCap ID="3" Name="MediaRef">
                <RefState Name="rRef" DefaultValue="Media_1"/>
            </DevCap>
            <IDState Name="ID" DefaultValue="LayoutPreparationParams_1"
                     UserDisplay="Hide"/>
            <StringState DefaultValue="OneSidedFront" Name="Sides">
                <Value AllowedValue="OneSidedFront"/>
                <Value AllowedValue="TwoSidedFlipX"/>
                <Value AllowedValue="TwoSidedFlipY"/>
            </StringState>
        </DevCap>
    </DevCaps>
    <DevCaps Context="Resource" ID="4" Name="InterpretingParams">
        <DevCap ID="5" Name="InterpretingParams">
            <IDState Name="ID" DefaultValue="InterpretingParams_1" UserDisplay="Hide"/>
            <StringState DefaultValue="Normal" Name="PrintQuality">
                <Value AllowedValue="High"/>
                <Value AllowedValue="Normal"/>
                <Value AllowedValue="Draft"/>
            </StringState>
        </DevCap>
    </DevCaps>
    <DevCaps Context="Resource" ID="6" Name="RenderingParams">
        <DevCap ID="7" Name="RenderingParams">
            <IDState Name="ID" DefaultValue="RenderingParams_1" UserDisplay="Hide"/>
        </DevCap>
    </DevCaps>
    <DevCaps Context="Resource" ID="8" Name="DigitalPrintingParams">
        <DevCap ID="9" Name="DigitalPrintingParams">
            <DevCap ID="10" Name="MediaRef>
                <RefState Name="rRef" DefaultValue="Media_1"/>
            </DevCap>
            <StringState DefaultValue="Sheet" Name="Collate">
```

-continued

```
                <Value AllowedValue="Sheet"/>
                <Value AllowedValue="None"/>
            </StringState>
            <IDState Name="ID" DefaultValue="DigitalPrintingParams_1"
                     UserDisplay="Hide"/>
            <StringState DefaultValue="Top" Name="OutputBin">
                <Value AllowedValue="Top"/>
                <Value AllowedValue="Stacker"/>
            </StringState>
        </DevCap>
    </DevCaps>
    <DevCaps Context="Resource" ID="11" Name="Component">
        <DevCap ID="12" Name="Component">
            <IDState Name="ID" DefaultValue="Component_1" UserDisplay="Hide"/>
            <StringState DefaultValue="Unavailable" Name="Status" UserDisplay="Hide"/>
            <StringState DefaultValue="Quantity" Name="Class" UserDisplay="Hide"/>
        </DevCap>
    </DevCaps>
    <DevCaps Context="Resource" ID="13" Name="RunList">
        <DevCap ID="14" Name="RunList">
            <DevCap ID="15" Name="LayoutElement">
                <DevCap ID="16" Name="FileSpec">
                    <URLState Name="URL"/>
                    <IDState Name="ID" DefaultValue="FileSpec_1" UserDisplay="Hide"/>
                </DevCap>
                <IDState Name="ID" DefaultValue="LayoutElement_1" UserDisplay="Hide"/>
            </DevCap>
            <IDState Name="ID" DefaultValue="RunList_1" UserDisplay="Hide"/>
        </DevCap>
    </DevCaps>
    <DevCaps Context="Resource" ID="17" Name="Media">
        <DevCap ID="18" Name="Media">
            <StringState DefaultValue="612 792" Name="Dimension">
                <Value AllowedValue="842 1191"/>
                <Value AllowedValue="595 842"/>
                <Value AllowedValue="420 595"/>
                <Value AllowedValue="297 420"/>
                <Value AllowedValue="729 1032"/>
                <Value AllowedValue="516 729"/>
                <Value AllowedValue="363 516"/>
                <Value AllowedValue="792 1224"/>
                <Value AllowedValue="612 1008"/>
                <Value AllowedValue="612 792"/>
                <Value AllowedValue="396 612"/>
                <Value AllowedValue="522 756"/>
                <Value AllowedValue="576 936"/>
                <Value AllowedValue="595 935"/>
                <Value AllowedValue="612 936"/>
                <Value AllowedValue="864 1296"/>
            </StringState>
            <StringState DefaultValue="White" Name="MediaColorName">
                <Value AllowedValue="White"/>
                <Value AllowedValue="Yellow"/>
                <Value AllowedValue="Blue"/>
                <Value AllowedValue="Red"/>
            </StringState>
            <IDState Name="ID" DefaultValue="Media_1" UserDisplay="Hide"/>
        </DevCap>
    </DevCaps>
    <DevCaps Context="Link" ID="19" Name="DigitalPrintingParams">
        <DevCap ID="20" Name="DigitalPrintingParams">
            <RefState Name="rRef" DefaultValue="DigitalPrintingParams_1"/>
            <StringState DefaultValue="Input" Name="Usage" UserDisplay="Hide"/>
        </DevCap>
    </DevCaps>
    <DevCaps Context="Link" ID="21" Name="InterpretingParams">
        <DevCap ID="22" Name="InterpretingParams">
            <RefState Name="rRef" DefaultValue="InterpretingParams_1"/>
            <StringState DefaultValue="Input" Name="Usage" UserDisplay="Hide"/>
        </DevCap>
    </DevCaps>
    <DevCaps Context="Link" ID="23" Name="LayoutPreparationParams">
        <DevCap ID="24" Name="LayoutPreparationParams">
            <RefState Name="rRef" DefaultValue="LayoutPreparationParams_1"/>
            <StringState DefaultValue="Input" Name="Usage" UserDisplay="Hide"/>
        </DevCap>
    </DevCaps>
    <DevCaps Context="Link" ID="25" Name="RenderingParams">
        <DevCap ID="26" Name="RenderingParams">
            <RefState Name="rRef" DefaultValue="RenderingParams_1"/>
```

-continued

```
        <StringState DefaultValue="Input" Name="Usage" UserDisplay="Hide"/>
      </DevCap>
    </DevCaps>
    <DevCaps Context="Link" ID="27" Name="RunList">
      <DevCap ID="28" Name="RunList">
        <RefState Name="rRef" DefaultValue="RunList_1"/>
        <StringState DefaultValue="Input" Name="Usage" UserDisplay="Hide"/>
      </DevCap>
    </DevCaps>
    <DevCaps Context="Link" ID="29" Name="Component">
      <DevCap ID="30" Name="Component">
        <RefState Name="rRef" DefaultValue="Component_1"/>
        <StringState DefaultValue="Output" Name="Usage" UserDisplay="Hide"/>
        <IntegerState AllowedValueList="1~999" DefaultValue="1" Name="Amount"/>
      </DevCap>
    </DevCaps>
    <DevCaps Context="Link" ID="31" Name="Media">
      <DevCap ID="32" Name="Media">
        <RefState Name="rRef" DefaultValue="Media_1"/>
        <StringState DefaultValue="Input" Name="Usage" UserDisplay="Hide"/>
      </DevCap>
    </DevCaps>
    <StringState DefaultValue="Waiting" Name="Status" UserDisplay="Hide"/>
    <StringState DefaultValue="Combined" Name="Type" UserDisplay="Hide"/>
    <IDState Name="ID" DefaultValue="JDF_1" UserDisplay="Hide"/>
    <StringState DefaultValue="LayoutPreparation Imposition Interpreting Rendering
        DigitalPrinting" Name="Types" UserDisplay="Hide"/>
    <StringState DefaultValue="1.2" Name="Version" UserDisplay="Hide"/>
  </DeviceCap>
 </Device>
</DeviceInfo>
```

Although specific embodiments were described herein, the scope of the invention is not limited to those specific embodiments. The scope of the invention is defined by the following claims and any equivalents thereof.

I claim:

1. A method for generating a device capabilities file for a corresponding device in a printing environment, the method comprising:
providing a plurality of JDF job tickets defined for use with the device;
generating an eXtensible Markup Language Schema (XMLS) file describing features of the device from the plurality of JDF job tickets;
parsing the XMLS file to identify one or more element types defined in the XMLS file and to associate each identified element type with a list of attributes and elements defined within the scope of the identified element type; and
processing each identified element type defined in the XMLS file to generate entries in the device capabilities file based on the list of attributes and elements.

2. The method of claim 1 wherein the step of processing each identified element type further comprises:
for a first identified element type of said each identified element type defined in the XMLS file, performing the additional steps of:
translating each attribute in the list of attributes and elements associated with said first identified element type into a corresponding device capabilities entry; and
recursively invoking the step of processing for each element in the list of attributes and elements associated with said first identified element type.

3. The method of claim 1 wherein the XMLS file represents features of the device encoded in a tree structure including a root Job Definition Format (JDF) element, the JDF element further comprising a plurality of attributes and a ResourcePool element and a ResourceLinkPool element, wherein the step of processing each identified element type further comprises:
translating each attribute in the list of attributes associated with the identified element type of the JDF element to generate a corresponding DeviceCap device capabilities entry;
recursively processing attributes and elements defined within the ResourcePool element to generate a corresponding DevCaps/DevCap device capabilities entry for each attribute defined within the ResourcePool element; and
recursively processing attributes and elements defined within the ResourceLinkPool element to generate a corresponding DevCaps/DevCap device capabilities entry for each attribute defined within the ResourceLinkPool element.

4. The method of claim 3
wherein the step of recursively processing attributes and elements defined within the ResourcePool element further comprises:
generating a corresponding DevCaps/DevCap device capabilities entry for each attribute defined within the ResourcePool element wherein each generated entry includes a context value of Resource, and
wherein the step of recursively processing attributes and elements defined within the ResourceLinkPool element further comprises:
generating a corresponding DevCaps/DevCap device capabilities entry for each attribute defined within the ResourceLinkPool element wherein each generated entry includes a context value of Link.

5. The method of claim 1 wherein the step of providing further comprises:
receiving user input defining the features of the device; and
generating the XMLS file based on the received user input.

6. A method for generating a device capabilities file describing available features for a corresponding device in a printing environment, the method comprising:

providing a plurality of Job Definition Format (JDF) job tickets representing combinations of settings of features of the device previously used with the device;

generating an eXtensible Markup Language Schema (XMLS) file from the plurality of JDF job tickets; and generating a device capabilities file for the device based on the XMLS file.

7. The method of claim 6 further comprising:

identifying a range of values for a numeric feature of the device from a plurality of entries of the XMLS file; and replacing the plurality of entries of the XMLS file with an entry indicating the range of values.

8. The method of claim 6 further comprising:

identifying a default value for a feature of the device from a plurality of entries of the XMLS file; and adding an entry to the device capabilities file indicating the default value for the feature.

9. The method of claim 6 further comprising:

receiving user input to adjust entries of the XMLS file prior to generating the device capabilities file.

10. The method of claim 9 wherein the step of adjusting further comprises:

identifying a range of values for a numeric feature of the device from a plurality of entries of the XMLS file; and replacing the plurality of entries of the XMLS file with an entry indicating the range of values.

11. The method of claim 6 wherein the step of providing further comprises:

providing a plurality of JDF job tickets representing all possible combinations of settings of features of the device.

12. A system for generating a device capabilities file for a device in a printing environment, the system comprising:

an eXtensible Markup Language Schema (XMLS) generator adapted to generate an XMLS file describing available features of the device, the XMLS file comprising one or more hierarchically arranged elements each describing one or more attributes corresponding to available features of the device; and a device capabilities generator coupled to receive the XMLS file and adapted to generate entries in the device capabilities file based on the attributes and elements in the XMLS file.

13. The system of claim 12 wherein the XMLS generator is further adapted to receive user input defining features of the device and is further adapted to generate the XMLS file in accordance with the received user input.

14. The system of claim 12 further comprising:

a plurality of Job Definition Format (JDF) job tickets defining features of the device;

wherein the XMLS generator is coupled to receive the plurality of JDF job tickets, and wherein the XMLS generator is further adapted to generate the XMLS file in accordance with the received plurality of JDF job tickets.

15. The system of claim 14 wherein the plurality of JDF job tickets comprise:

a plurality of JDF job tickets previously generated for use with the device.

16. The system of claim 14 wherein the plurality of JDF job tickets comprise:

a plurality of JDF job tickets representing all possible combinations of feature settings for all available features of the device.

17. The system of claim 12 further comprising:

an XMLS editor coupled to receive the generated XMLS file and adapted to adjust entries of the XMLS file prior to the device capabilities generator operating to generate the device capabilities file.

* * * * *